(12) United States Patent
Chszaniecki

(10) Patent No.: US 6,827,477 B2
(45) Date of Patent: Dec. 7, 2004

(54) COMPOUNDER INSTALLATION

(75) Inventor: Siegfried Chszaniecki, Hannover (DE)

(73) Assignee: Berstorff GmbH, Hannover (DE)

( * ) Notice: Subject to any disclaimer, the term of this patent is extended or adjusted under 35 U.S.C. 154(b) by 0 days.

(21) Appl. No.: 10/250,490

(22) PCT Filed: Jan. 17, 2002

(86) PCT No.: PCT/DE02/00211
§ 371 (c)(1),
(2), (4) Date: Jul. 30, 2003

(87) PCT Pub. No.: WO02/057059
PCT Pub. Date: Jul. 25, 2002

(65) Prior Publication Data
US 2004/0100859 A1 May 27, 2004

(30) Foreign Application Priority Data
Jan. 22, 2001 (DE) .......................................... 101 04 311

(51) Int. Cl.$^7$ .............................. B29B 7/00; B29B 7/80; B29B 37/00; B29B 47/08
(52) U.S. Cl. ......................... 366/100; 366/141; 366/331
(58) Field of Search ................................ 366/100, 331, 366/141

(56) References Cited
U.S. PATENT DOCUMENTS

| 2,723,422 A | * | 11/1955 | Marshall ..................... 366/76.3 |
| 3,730,487 A | * | 5/1973 | Lund ........................... 366/91 |
| 3,960,368 A | * | 6/1976 | Kishimoto ..................... 366/77 |
| 4,695,167 A | * | 9/1987 | Mori et al. ............... 366/158.2 |
| 5,261,746 A | * | 11/1993 | Boasso ......................... 366/276 |
| 5,344,230 A | * | 9/1994 | Kowalczyk et al. ........ 366/100 |
| 5,944,420 A | * | 8/1999 | Petit ........................... 366/349 |
| 6,155,817 A | * | 12/2000 | Hehl ........................... 425/574 |

FOREIGN PATENT DOCUMENTS

| DE | 198 48 161 A | 4/2000 |
| EP | 0 607 790 A | 7/1994 |
| WO | WO 97/21528 A | 6/1997 |

* cited by examiner

Primary Examiner—Tony G. Soohoo
(74) Attorney, Agent, or Firm—Henry M. Feiereisen

(57) ABSTRACT

The invention relates to a compounder comprising a mixing unit, which can be mechanically driven by a drive module and is provided with one or more feed devices (5) for the material to be processed and one or more additives that are to be mixed with this material. The mixing unit is located in a supporting frame configured as a three-dimensional framework, and the supply and discharge lines required to operate the mixing unit, for the material being processed, and auxiliary materials or operational materials and energy as well as for the measurement, control and regulation technologies are substantially completely installed in or on the supporting frame and are connected to the mixing unit. The supporting frame is configured both as a transport frame for transporting the compounder to the job site and as a mounting frame for the placement of the operational compounder on a substructure at the job site. According to the invention, mechanical vibrations caused by the drive module of the mixing unit are kept at bay from the vibration-sensitive devices of the installation.

23 Claims, 1 Drawing Sheet

COMPOUNDER INSTALLATION

BACKGROUND OF THE INVENTION

The invention relates to a compounder according to the preamble of claim 1.

Compounders for mixing, for example plastics with additives such as fiber materials and other additives and colorants, to produce a generally granulated compounded material to be used for further processing normally include a screw extruder as central part for mixing various materials to be processed. The mixing units typically involved here are twin screw extruders rotating in same direction or opposite direction and operated by a drive module which normally includes an electric motor and an attached gearbox. Of course, it is also possible to provide a different drive, for example a hydraulic motor. Heretofore, such a mixing unit is typically equipped with a separate machine frame for support of the drive module and the processing unit (extruder barrel with the extrusion space). Up to now, it has been common practice to separately transport the mixing unit and the supply and discharge lines, required for operation of the mixing unit, for material being processed and auxiliary and process materials and energy as well as for measurement, control and regulation technologies as well as the required switch cabinets and auxiliary devices (e.g. weigh feeders, suction units), and to position and operatively connect them at the job site. This significantly complicates the assembly and the break-in of the compounder by the personnel of the plant manufacturer at the job site.

In order to reduce the assembly works and facilitate the break-in operation, it has been known to complete installation of at least the essential parts of the compounder, i.e. in particular the actual mixing unit with the periphery required for operation, in a three-dimensional framework already at the manufacturing factory and to transport this practically operational construction together with the three-dimensional framework to the job site, where it is only necessary to place the three-dimensional framework upon the prepared substructure and to anchor it. There is no need to lay and mount the supply and discharge lines for operation of the compounder at the job site, so that the time to commence operation is reduced to a small fraction of the otherwise typical time. Thus, the three-dimensional framework assumes hereby not only an essential function for the transport of the compounder but remains at the job site also a part of the overall plant so as to assume also the function of a mounting frame that is only required to be placed upon a substructure.

The mounting of the lines and individual units at the factory end in or on the three-dimensional framework is accompanied, however, also by a significant drawback because vibrations, caused in particular by the drive module of the mixing unit, are transmitted via the supporting frame also onto other units which are sensitive to vibrations. An example includes the weigh feeders whose precision is adversely affected by mechanical vibrations. Such vibrations may also damage electronic devices and lead, for example, to malfunction of plugged boards as a result of a loosening.

Remedies, involving an indirect connection of the mixing unit with its drive module to the three-dimensional framework through intervention of dampening elements (e.g. rubber pads), resulted in a significant but still in many cases insufficient improvement.

SUMMARY OF THE INVENTION

It is an object of the present invention to provide an improved compounder in such a way that mechanical vibrations caused by the drive module of the mixing unit are prevented from adversely affecting the operation of the compounder in a simplest possible manner.

This object is attained in accordance with the present invention by an apparatus having a mixing unit which can be mechanically driven by a drive module and is provided with one or more feed devices for the material to be processed and one or more additives to be mixed with this material, wherein the mixing unit is disposed in a supporting frame configured as a three-dimensional framework, and wherein the supply and discharge lines required for operating the mixing unit, for material to be used and auxiliary or process materials and energy as well as for measurement, control and regulation technologies are substantially completely installed in or on the supporting frame and are connected to the mixing unit, wherein the supporting frame is configured as a transport frame for the transport of the compounder to the job site as well as a mounting frame for the installation for operation of the compounder upon a substructure at the job site, wherein the drive module is supported on at least one intermediate frame which can be secured in a position ready for operation in the supporting frame by means of detachable connections for the transport, and that there are provided underneath the at least one intermediate frame supports which extend through openings in the bottom of the supporting frame for support at the job site upon the substructure and so dimensioned in height that the intermediate frame is slightly lifted from the bottom of the supporting frame, when the supporting frame is placed upon the substructure.

The solution according to the invention is based on the principle to provide a substantially complete decoupling between drive module and the supporting frame, designed as three-dimensional framework, for the compounder, whereby the functionality of the supporting frame remains fully intact for the transport from the manufacturer's factory to the job site. This means that the mixing unit is fixedly connected with the supporting frame during transport. The connection is implemented by detachable connections which are removed again at the job site. The essence of the invention is the securement of the drive module, which in most cases is comprised of an electric motor and a coupled gearbox, upon a common intermediate frame for both units. It is also possible, although less advantageous, to provide separate intermediate frames for both units. The intermediate frame can be effectively lifted from the supporting frame by means of supports, which can be placed at the job site upon the substructure underneath the intermediate frame through openings in the bottom of the supporting frame, or are already mounted to the intermediate frame. The intermediate frame rests thus only during transport directly on the supporting frame and is fixed thereto. At the job site, the intermediate frame is slightly lifted from the bottom of the supporting frame, after detaching the fixation, when the supporting frame is placed upon the substructure. It is hereby essential that the drive module, despite this elevation, virtually retains the ready position which has been maintained also during the transport process. Thus, all connections, which have been established during assembly at the manufacturer's end, remain virtually unchanged during transport and after the final installation at the job site. The height of the supports is so dimensioned that lifting of the intermediate frame from the supporting frame is suitably in the range of, for example, few millimeters. It is only required to prevent a direct physical contact between the intermediate frame and the supporting frame.

Suitably, the provision of a separate machine frame for the mixing unit, which preferably is a separate twin screw extruder rotating in same direction or opposite direction, is omitted in the compounder according to the invention. This is easily possible because the processing unit of the mixing unit, i.e. the extruder barrel, can be securely connected directly with the drive module, which in turn can be fixed via the intermediate frame. The processing unit can hereby be suspended freely, when the length is short enough. In case of a long processing unit, the provision of an additional support is recommended. Such a support could be realized on the supporting frame as this would be provided anyway for the transport process. Through intervention of respective vibration dampers, the introduction of vibrations via the processing unit can be attenuated. Clearly preferred is however a solution in which at least one additional support is provided for the processing unit and extended through an opening in the bottom of the supporting frame, which rests upon the substructure, for direct support upon the substructure.

To compensate for manufacturing tolerances of the contact points of the substructure for the supports, it may be advantageous to configure the supports for carrying the intermediate frame and/or carrying the processing unit in a height-adjustable manner. Hereby, the supports may be provided with screw feet which can be secured in the final mounting position.

Suitably, the supporting frame is equipped with a compartment which is enclosed by walls and separated from the part of the supporting frame which houses the mixing unit. This enclosed compartment preferably accommodates the necessary switch cabinets for the measurement, control and regulation technologies as well as energy supply. Control may be realized by a typical PC system which can also be accommodated in this enclosed compartment and thereby remains unaffected from mechanical vibrations. This compartment may also be kept free from other interfering influences such as moisture and high temperature in a simple manner through air-conditioning.

Preferably, the supporting frame has a substantially block-shaped configuration and has outer dimensions and connection dimensions and connection devices of a standard container. This is highly advantageous with respect to handling during road transport or rail transport.

Suitably, the roof of the supporting frame is configured for foot traffic and provided with fastening devices for mounting additional devices for the compounder. Then, the attachment of, for example, a weigh feeder or a further supporting frame with the required metering devices can easily be mounted to the roof of the supporting frame. The necessary line connections for a weigh feeder are already mounted inside the supporting frame in the form of prepared interfaces. Of course, during transport, the weigh feeder is dismantled to prevent damage.

BRIEF DESCRIPTION OF THE DRAWINGS

An exemplified embodiment of the invention will now be described in more detail with reference to the single FIGURE which illustrates a schematic side view of a compounder according to the invention.

DETAILED DESCRIPTION OF PREFERRED EMBODIMENTS

Figure 1:
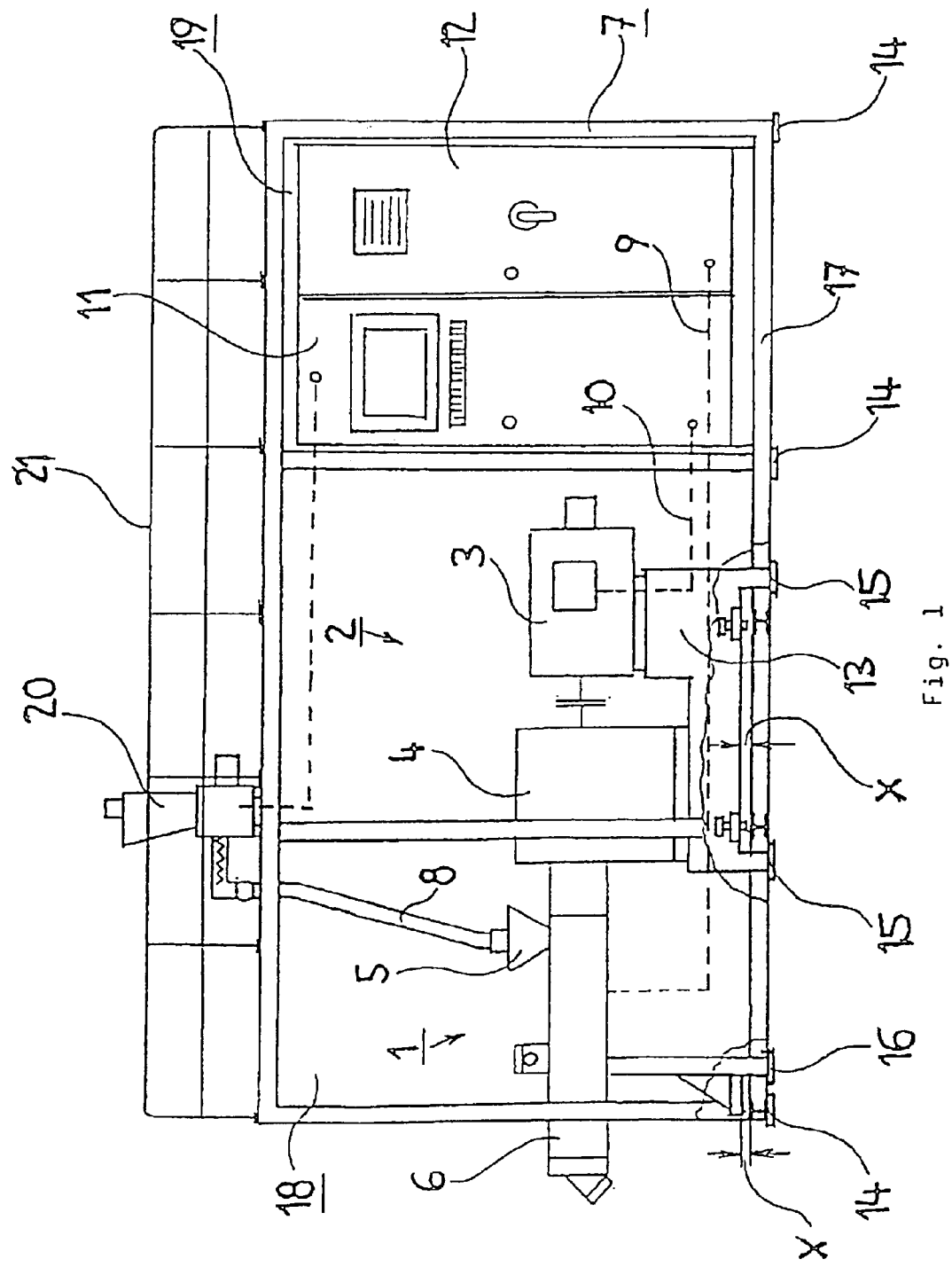

The depicted compounder includes a mixing unit 1, for example a twin screw extruder. The drive module 2 of this mixing unit 1 includes an electric motor 3 and a gearbox 4 coupled thereto. The motor 3 and the gearbox 4 are securely mounted to a common intermediate frame 13. Flange-mounted directly to the gearbox 4 is the processing unit of the extruder in the form of the extruder barrel 6. The extruder barrel 6 is provided with a funnel-shaped feed device 5 for the materials to be processed. The mixing unit 1 is located within a supporting frame 7 which is configured as three-dimensional framework and divided in a partial compartment 18 for the mixing unit 1 and a partial compartment 19. The supporting frame 7 has a substantially block-shaped configuration and has outer dimensions and connection dimensions and connection devices of a standard container. The bottom of the supporting frame 7 is designated by reference numeral 17. Disposed underneath the bottom 17 are contact points 14 for placement of the supporting frame 7 in the final mounting position upon a not shown substructure at the respective job site. Schematically indicated in the compartment 19 are two switch or control cabinets 11, 12 to ensure the necessary energy supply (primarily electric current) and the fluid supply (e.g. coolant) as well as the measuring, control and regulation technologies of the plant, for operation of the mixing unit 1. The line extending from the switch cabinet 11 to the electric motor 3 is designated with 10, while the line extending from the switch cabinet 12 to the processing unit 6 of the mixing unit 1 is designated with 9. Both lines are shown in broken line. Placed upon the roof of the supporting frame 7, which is constructed for foot traffic and subsequently provided with a railing 21, is a weigh feeder 20 which is sensitive to mechanical vibrations and has the task to introduce additives for mixture with the material being used in the mixing unit 1, via the feed device 5 through a supply line 8 into the extruder barrel 6. The weigh feeder 20 is also run by the electronics installed in the switch cabinet 12. The partial compartment 19 is provided in a manner not shown in detail with outer walls and thereby separated from the immediate surroundings and preferably air-conditioned so that the devices accommodated therein are not exposed to interfering external influences. This is also true for the impact of mechanical vibrations as caused by the drive module 2 of the mixing unit 1. Transmission of these mechanical vibrations onto the supporting frame 7 is prevented by lifting the intermediate frame 13, which rests securely during transport upon the bottom 17 of the supporting frame 7, from the bottom 17 in the illustrated installation position at the job site. This is implemented by means of both illustrated supports 15 which are guided through openings in the bottom 17 and supported directly upon the not shown substructure. The height of the supports 15 is hereby so dimensioned that the underside of the intermediate frame 13 is lifted from the top side of the bottom 17 by a small distance X, shown exaggerated in the illustration and in reality is preferable in the range of millimeters. In the final mounting position, the intermediate frame 13 is thus not supported by the supporting frame 7 but is directly connected via the supports 15 with the substructure. In view of its relatively great length, the processing unit 6 of the mixing unit 1 is also supported directly on the not shown substructure by a support 16 which extends through an opening in the bottom 17 of the supporting frame 7. During the transport, the processing unit 6 is held by a not shown retention device supported interiorly of the supporting frame 7 and removed again at the job site of the plant. The position of the mixing unit 1 is virtually the same during transport and after placement of the plant at the job site within the supporting frame. Only implemented is the slight vertical shift by the indicated distance X after the final disposition for the operation has been reached. This shift is small enough to maintain all connected lines at the mixing unit for fluid conduction or transmission of signals or electric energy.

This enables to fully test and break-in the complete plant already at the manufacturer's end and subsequently to transport it almost unchanged to the job site and to operate it again there, without any need for a complicated new break-in procedure. During transport, all units are sufficiently secured hereby. Yet, when being positioned at the job site, the particular support of the intermediate frame 13 upon the supports 15 ensures a complete decoupling from mechanical vibrations. The supports 15, 16 may, optionally, be attached at the job site. Of course, it is also possible to connect the supports already at the manufacturer's end securely with the intermediate frame 13 and the processing unit 16, respectively. Hereby, there is no need to extend the underside of the supports 15, 16 up to beneath the connecting line of the contact points 14 on the bottom side of the bottom 17 of the supporting frame 7. The required height may, for example, be ensured, by the afore-mentioned height adjustment of the supports 15, 16 or also through a respective elevation on the provided contact points of the substructure.

What is claimed is:

1. Compounder, comprising a mixing unit (1) which can be mechanically driven by a drive module (2) and is provided with one or more feed devices (5) for material to be processed and one or more additives to be mixed with this material, wherein the mixing unit (1) is disposed in a supporting frame (7) configured as a three-dimensional framework, and wherein supply and discharge lines (8, 9, 10), required for operating the mixing unit (1), for material to be used and auxiliary or process materials and energy as well as for measurement, control and regulation technologies are substantially completely installed in or on the supporting frame (7) and are connected to the mixing unit (1), wherein the supporting frame (7) is configured as a transport frame for the transport of the compounder to a job site as well as a mounting frame for the installation for operation of the compounder upon a substructure at the job site, wherein the drive module (2) is supported on at least one intermediate frame (13) which can be secured in a position ready for operation in the supporting frame (7) by means of detachable connections for the transport, and further comprising first supports (15) provided underneath the at least one intermediate frame (13) and extending through openings in a bottom (17) of the supporting frame (7) for support at the job site upon the substructure, said first supports being so dimensioned in height that the intermediate frame (13) is slightly lifted from the bottom (17) of the supporting frame (7), when the supporting frame (7) is placed upon the substructure.

2. Compounder according to claim 1, wherein the mixing unit (1) is configured as screw extruder.

3. Compounder according to claim 2, wherein the extruder screw is a twin screw extruder rotatable in same direction or opposite direction.

4. Compounder according to claim 1, wherein the drive module (2) includes an electric motor (2) and a gearbox (4) coupled thereto, with both mounted on the intermediate frame (13).

5. Compounder according to claim 1, wherein the mixing unit (1) is fixedly connected directly with the drive module (2), without separate machine frame.

6. Compounder according to claim 1, and further comprising at least one additional second support (16) provided for the extruder barrel (6) of the mixing unit (1) and extending through an opening in the bottom (17) of the supporting frame (7) for direct support upon the substructure, when the supporting frame (7) rests upon the substructure.

7. Compounder according to claim 6, wherein the first and second supports (15, 16) are configured for height adjustment.

8. Compounder according to claim 7, wherein the first and second supports (15, 16) have screw feet for height adjustment.

9. Compounder according to claim 1, and further comprising a PC system, disposed inside the supporting frame (7), for control of the compounder.

10. Compounder according to claim 1, wherein the supporting frame (7) has a substantially block-shaped configuration.

11. Compounder according to claim 10, wherein the supporting frame (7) has outer dimensions and connection dimensions and connection devices of a standard container.

12. Compounder according to claim 1, wherein the supporting frame (7) has a compartment (19) which is enclosed by walls for accommodation of switch cabinets (11, 12) for the measurement, control and regulation technologies as well as for the energy supply.

13. Compounder according to claim 1, of wherein the supporting frame (7) has a roof which is constructed for foot traffic.

14. Compounder according to claim 1, and further comprising fastening means disposed on the roof of the supporting frame (7) for mounting of an auxiliary device.

15. Compounder according to claim 14, wherein the auxiliary device is a weight feeder.

16. A compounder, comprising:
a supporting frame;
a mixing unit disposed in the supporting frame and receiving material to be processed;
a drive module for operating the mixing unit; and
at least one intermediate frame for support of the drive module, said intermediate frame being movable in relation to the supporting frame between a first position in which the intermediate frame securely rests upon a bottom of the supporting frame, and a second position in which the intermediate frame is elevated in relation to the bottom of the supporting frame and the supporting frame is placed upon a substructure.

17. The compounder of claim 16, wherein the intermediate frame is mounted on supports which extend through openings in the bottom of the supporting frame, said supports being so dimensioned in height that the intermediate frame is lifted from the bottom of the supporting frame, when the supporting frame is placed upon the substructure.

18. The compounder of claim 17, wherein the supports have height adjustment means.

19. The compounder of claim 16, wherein the supports form an integral part of the intermediate frame.

20. The compounder of claim 16, wherein the supports form an integral part of the substructure.

21. The compounder of claim 16, wherein the mixing unit is fixedly connected directly with the drive module.

22. The compounder of claim 16, wherein the mixing unit has an extruder barrel, and further comprising at least one additional support for maintaining the extruder barrel in position, said additional support extending through an opening in the bottom of the supporting frame for direct support upon the substructure, when the supporting frame rests upon the substructure.

23. The compounder of claim 22, wherein the additional support has height adjustment means.

* * * * *